INVENTORS
RICHARD L. WEAVER
BENJAMIN K. SMOKER
BY

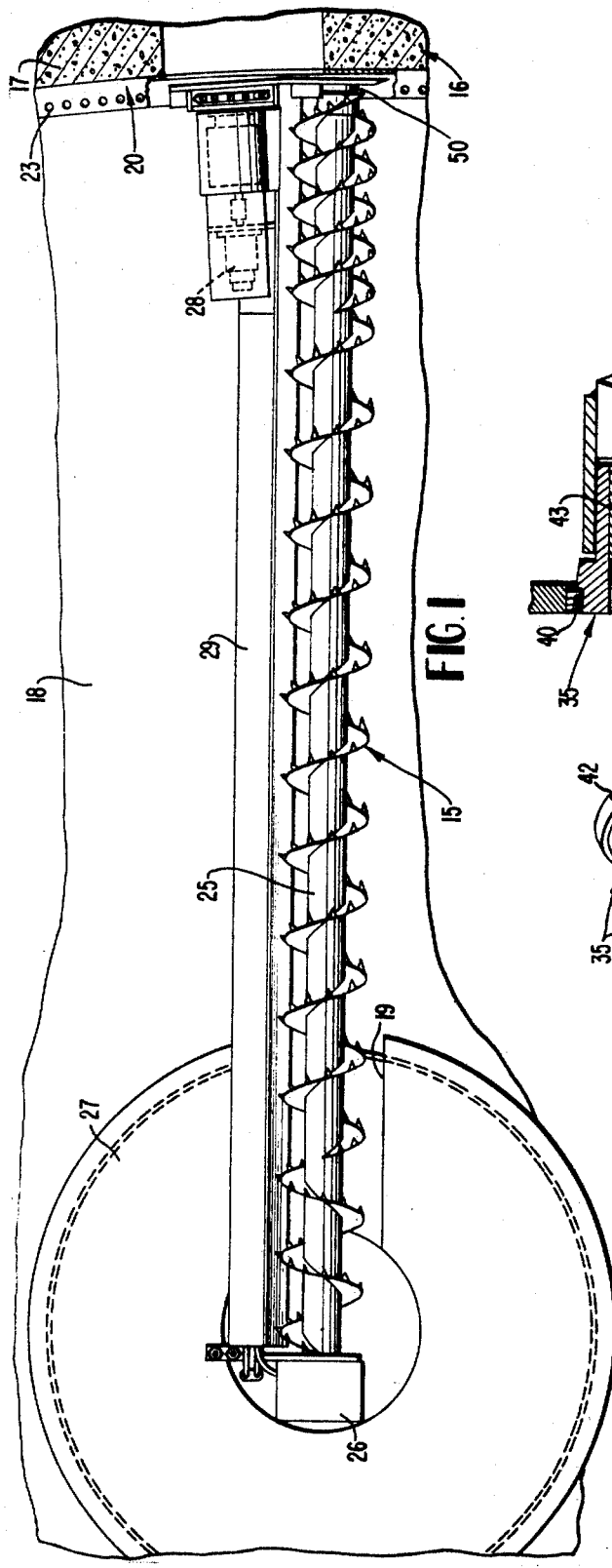
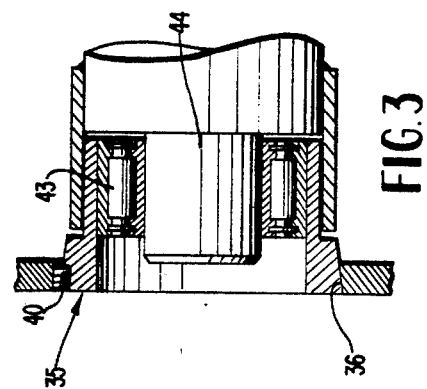
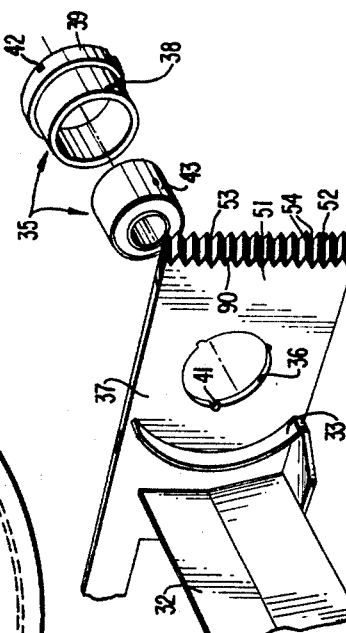
INVENTORS
RICHARD L. WEAVER
BENJAMIN K. SMOKER
BY Wynne & Finken
ATTORNEYS March 17, 1970     R. L. WEAVER ET AL     3,501,029
SILO BOTTOM UNLOADER APPARATUS Filed April 17, 1968     2 Sheets-Sheet 2

*Wynne & Finken*
ATTORNEYS

United States Patent Office 3,501,029
Patented Mar. 17, 1970

3,501,029
SILO BOTTOM UNLOADER APPARATUS
Richard L. Weaver and Benjamin K. Smoker, both of
Rte. 3, Myerstown, Pa. 17067
Filed Apr. 17, 1968, Ser. No. 722,073
Int. Cl. B65g 65/30
U.S. Cl. 214—17                                   7 Claims

ABSTRACT OF THE DISCLOSURE

A supporting arrangement is provided for the outer end of an auger used in sweeping the bottom of a silo wherein a plate runner slides within a U-channel and has a cutter means on its forward end formed by a plurality of vertically spaced skew chisel-type cutters with their straight substantially horizontal cutting edges extending from an outer pointed tip rearwardly and inwardly, this skew chisel system coacting with auger blades within the U-channel to cut and remove silage and thereby prevent silage densification on forward movement. The auger is supported within a bearing-adapter assembly which facilitates replacement and lubrication. The sweep means for the auger means is removably supported in a non-circular aperture in the runner by means of a mating base lock plate which transfers sweeping torque forces through the runner to the anchored U-channel.

---

The instant invention relates to an improved structural assembly for the outer end of a sweep auger used in the bottom of a silo for delivering silage to a central opening. The apparatus is an improvement on that disclosed in Ser. No. 567,722, filed July 25, 1966, now Patent No. 3,391,809, inventors: Richard L. Weaver and Benjamin K. Smoker, entitled Silo Bottom Unloader System.

Maintenance of auger equipment has necessitated long shut-down time because of inaccessibility of major wearing parts. The instant structural assembly provides for easy removal of the critical auger bearing at the outer end of the auger means without sacrificing the required rigid structural integrity of this vital part of the system. The forces encountered at the outer end are extreme and fluctuate irregularly between widely varying force levels. Further, lubricating means are provided and are easily available to the farmer for normal maintenance.

Extensive tests and research have proved the vital necessity for the cutter means of the instant invention which in combination with auger blades extending within the U-channel circular track significantly eliminate the load inherent in other designs which severely densify silage forward of the runner within the track. The leading edge portion of the runner may be viewed as a vertically stacked integrated plurality of skew chisel-type cutters, the substantially horizontal cutting edges of which extend rearwardly and inwardly from the outer side face of the runner, and define triangular saw teeth tips at the outer side face. The beveled faces of adjoining cutters define silage conducting troughs between adjacent cutting edges which provide for smooth flow of the cut silage pieces.

These and further objects and advantages of the present invention will become more apparent upon reference to the following specification, appended claims and drawings wherein:

FIG. 1 is a top plan view of the apparatus installed in a silo;

FIG. 2 is a perspective blow-up of the forward portion of the runner and the auger bearing means;

FIG. 3 is a view in section of the assembled bearing parts of FIG. 2;

Figure 4:
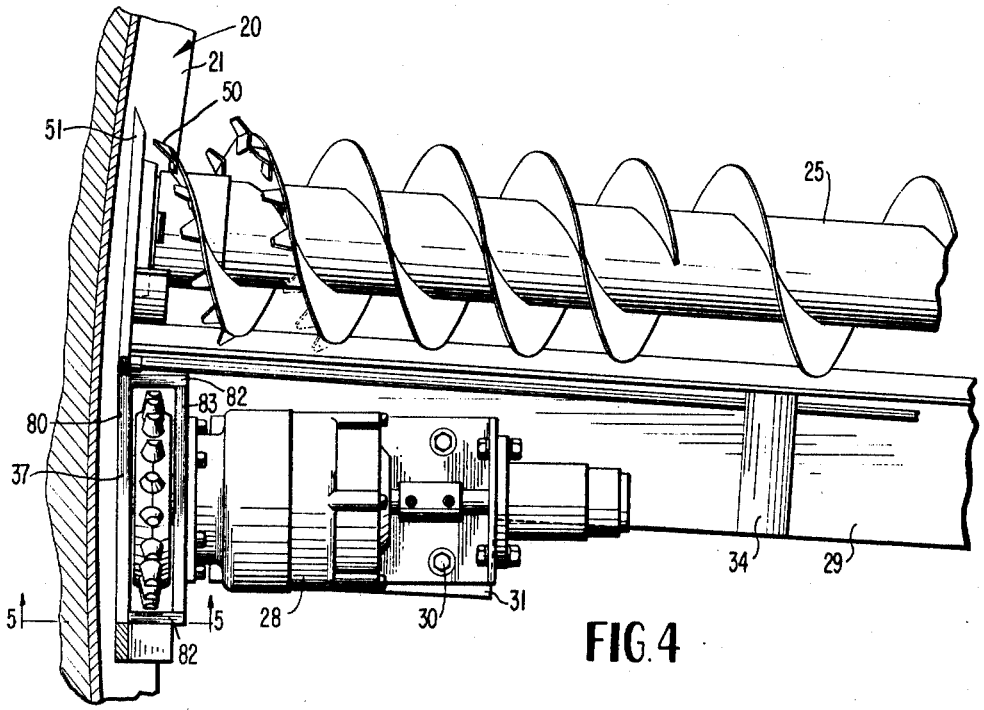
FIG. 4 is an enlarged top view of the outer end of the auger means in a silo.

The auger means 15 is mounted within a silo 16 having a cylindrical upright wall 17 and a circular bottom floor 18 with a central opening 19 for silage discharge (FIG. 1). A U-channel circular track 20 is anchored to the outer edge of the bottom floor 18 with its top leg 21 and bottom leg 22 extending inwardly, the top leg 21 having drive holes 23 therethrough (FIG. 5).

The auger means 15 includes the auger 25 which extends between the discharge opening 19 and the track 20. Suitable rotating means, such as hydraulic drive means 26, is mounted on a rotatable central support 27, preferably beyond the center line at the center portion of the silo, as set forth in the aforementioned application, Ser. No. 567,722, now Patent No. 3,391,809. Sweep means 28 of the hydraulic type is mounted at the outer end of the auger means 15 on the auger arm 29, the sweep means 28 being anchored by bolts 30 to the supporting structure 31. A guide plate 32 equipped with a corner shield 33 at its outer end is provided behind the auger for directing silage to the central opening 19. The guide plate 32 is braced by spaced strap braces 34 connected to the supporting structure 31.

The bearing means 35 is mounted in an inwardly tapered seat 36 in the forward portion of the slightly arcuate plate runner 37. The bearing means 35 includes a mating tapered adapter 38 having an outer tapered collar 39 which seats inwardly against the seat 36 and is held there by suitable securing means 40 such as the peripheral screws 40, three of which are provided at equiangular positions. The screws 40 are threaded into half threads 41 and 42 provided in the runner seat periphery and the collar periphery respectively. The inner part of adapter 38 houses a self-aligning roller bearing 43 and the anger shaft 44 is rotatably supported therein. The bearing 43 may be easily removed by removing the three screws 40 and by utilizing the removal slots 45 of the adapter; the adapter may be drawn from its firmly seated position so that the bearing 43 can be easily replaced with a minimum of down-time.

Figure 5:
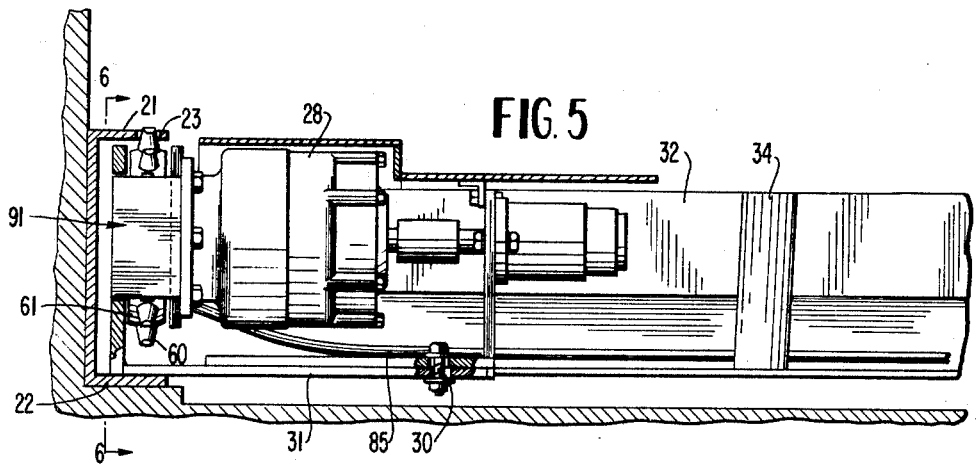
FIG. 5 is a side view of FIG. 4 with a section taken on line 5—5 for the outermost part.
Figure 6:
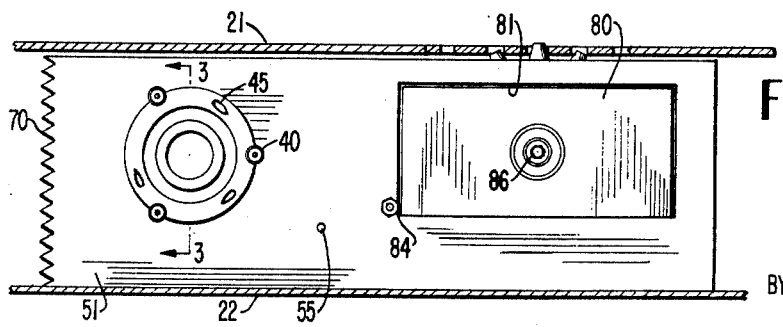
FIG. 6 is an end view of FIG. 5, taken on line 6—6.

Referring to FIGS. 4—6, it will be seen that the outwardly extending blades 50 of the auger 25 extend into the U-channel circular track 20 and coact with the cutter means 51 for silage removal. The cutter means 51 (FIGS. 2 and 6) involves a series of skew chisel-type cutters 52, and in the embodiment shown, these are integrally formed as part of the rectangular plate runner 37. The cutters 52 present substantially horizontal cutting edges 53 on each side of which is a sharply slanted beveled wall 54 providing a trough 90 for cut silage flow to the auger and its blades. FIG. 6 shows the outer side face 55 of the runner 37 and the triangular saw tooth points or tips 70 formed thereat by the skew chisel-type cutters.

The arcuate or angulate form of the runner 37 can be viewed in FIG. 4. The self-clearing cone-like teeth 60 of the sweep wheel 61 can be viewed in FIG. 5. FIGS. 5 and 6 show the rigid mounting system for the sweep means on the supporting structure 31 through bolts 30, and also the rigid rectangular tube housing 91 which surrounds the sweep wheel 61 and is part of the base of the sweep means. The rectangular tube includes a base lock plate 80 at its outer end which matingly seats within a non-circular aperture 81 in the rearward portion of the running for transferring sweeping torque forces produced by the sweep means to the U-channel circular track through the runner. The rectangular tube includes also the side panels 82 and the inner vertical plate 83 positioned inwardly of the drive wheel and rigidly affixed to the housing and base of the sweep means.

A grease conduit fitting 84 for the grease tube 85 which extends to the center of the auger means is positioned at a corner of the rectangular opening for the rectangular base lock plate 80. A suitable grease fitting 86 is also provided for the drive wheel.

The runner has a vertical dimension which enables a slight amount of vertical and rotative movement. Tests have shown that a predetermined amount of clearance (FIG. 6) reduces the shock on the critical end parts and more importantly allows the cutter means to effectively strip and cut silage as it advances and thereby inhibit the production of a densified silage mass, particularly within the U-channel circular track.

What is claimed is:

1. In a silo bottom unloader system for a silo having a cylindrical upright wall and a circular bottom floor with a central opening;
   a U-channel circular track anchored at the outer bottom floor of the silo with its top leg and bottom leg extending inwardly;
   an auger means including an auger extending between said opening and the track, rotating means for rotating said auger about its own axis for delivery of silage to said opening, and sweep means for driving said auger about said bottom floor; and
   a runner slidably positioned with the U-channel circular track having top and bottom surfaces for sliding contact with the top and bottom legs and including bearing means at its forward portion for rotatably supporting the outer end of the auger, the leading edge portion of the runner extending between the top and bottom legs and having a cutter means including a plurality of vertically spaced skew chisel-type cutters, the substantially horizontal cutting edge of each cutter extending from the tip of a triangular saw tooth point at the outer side face of the runner rearwardly and inwardly to the inner side face of the runner.

2. In a silo bottom unloader system as defined in claim 1 and wherein said runner has a non-circular aperture in its rearward portion, said sweep means being located at the outer end of said auger means and including a base lock plate matingly seated within said non-circular aperture for transferring sweeping torque forces produced by said sweep means to the U-channel circular track through the runner.

3. In a silo bottom unloader system as defined in claim 1 and whereing a runner has a tapered seat in its forward portion and said bearing means includes a mating tapered adapted which seats inwardly against the seat, securing means for holding said adapter in seated condition, a roller bearing positioned within said adapter for receiving said auger.

4. In a silo bottom unloader system defined in claim 3 and wherein said runner has a non-circular aperture in its rearward portion, said sweep means being located at the outer end of said auger means and including a base lock plate matingly seated within said non-circular aperture for transferring sweeping torque forces produced by said sweep means to the U-channel circular track through the runner.

5. In a silo bottom unloader system as defined in claim 3 and wherein said auger has blades at its outer end which extend into said U-channel circular track and coact with said cutter means to cut and remove silage from the track and thereby inhibit formation of a compressed wedge of silage ahead of said runner.

6. In a silo bottom unloader system as defined in claim 5 and wherein said runner is a rectangular arcuate plate, said non-circular aperture is rectangular, and said tapered seat is circular.

7. In a silo bottom unloader system as defined in claim 6 and wherein said U-channel circular track has drive holes in its top leg, said base lock plate is part of a base for said sweep means, said sweep means includes a drive wheel having cone-like teeth which mesh with said drive holes, said base including an inner vertical plate inwardly of said drive wheel, and side panels which with said base lock plate defining a rigid rectangular tube housing for said drive wheel.

References Cited

UNITED STATES PATENTS 3,121,501   2/1964   Laidig _____ 214—17

ROBERT G. SHERIDAN, Primary Examiner